March 30, 1965  F. C. DAWSON  3,175,565
DISHWASHER-DRYER COMBINATION
Filed May 4, 1961  3 Sheets-Sheet 1
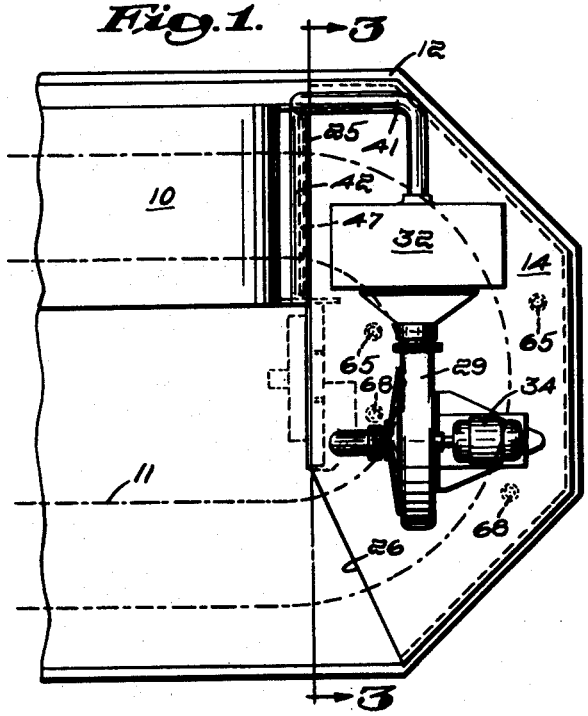
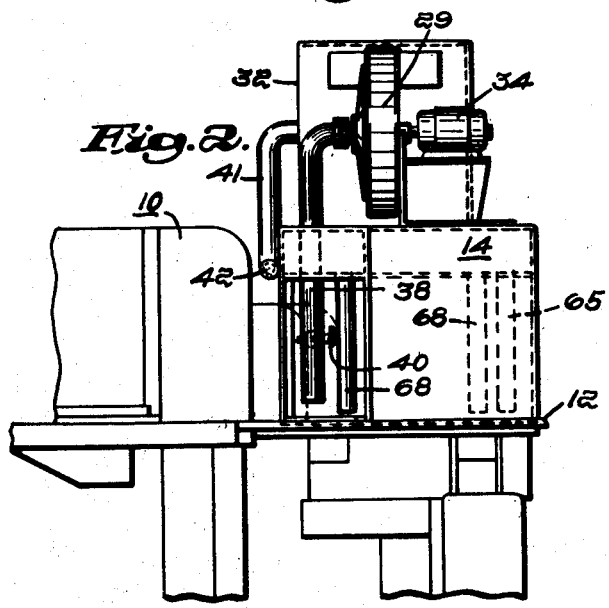
Inventor:
Fred C. Dawson,
by Robert J. Palmer
Attorney March 30, 1965   F. C. DAWSON   3,175,565
DISHWASHER-DRYER COMBINATION
Filed May 4, 1961   3 Sheets-Sheet 2
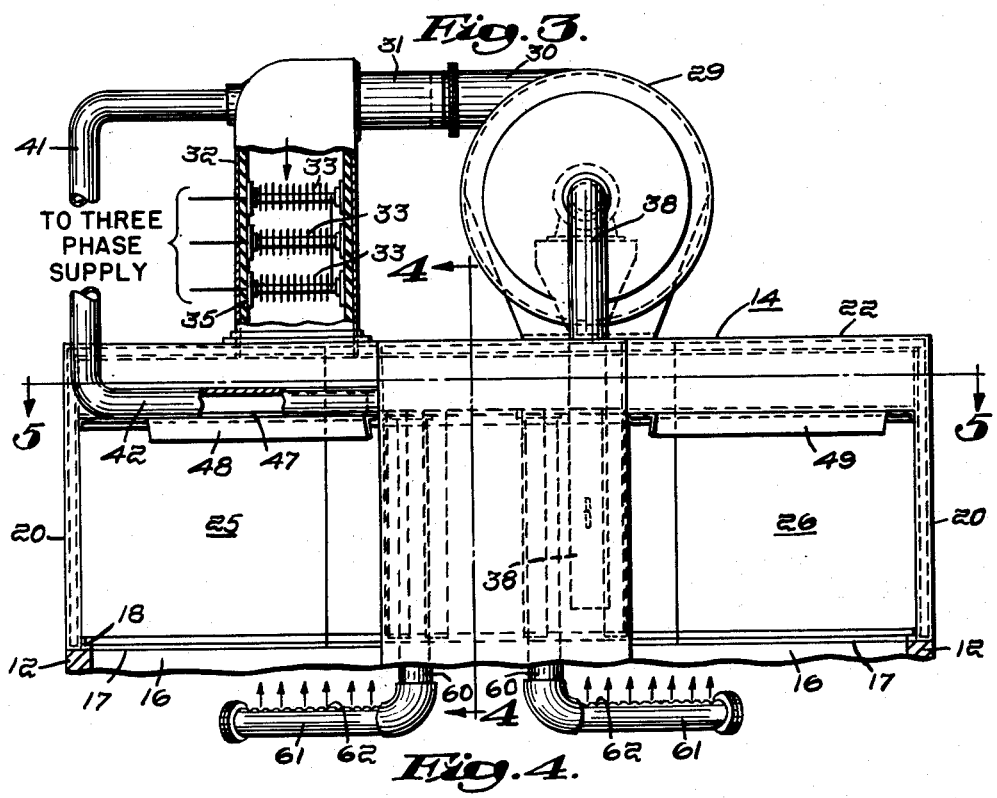
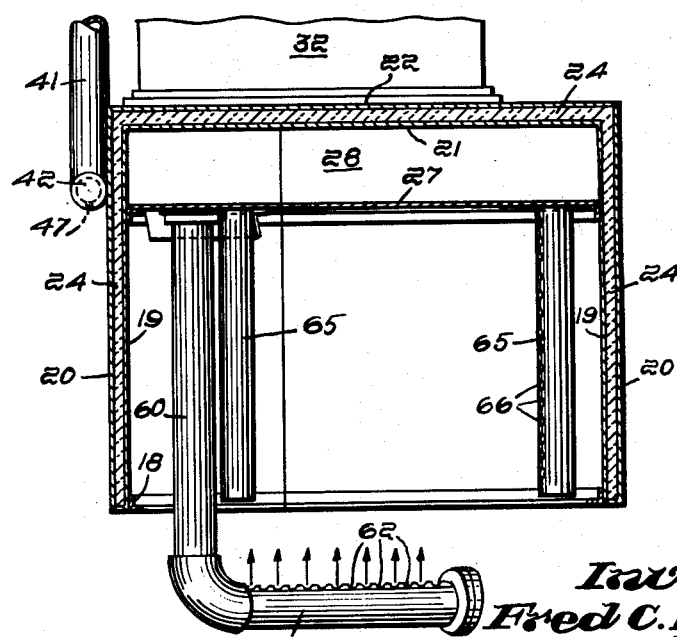
Inventor:
Fred C. Dawson,
by Robert J. Palmer
Attorney

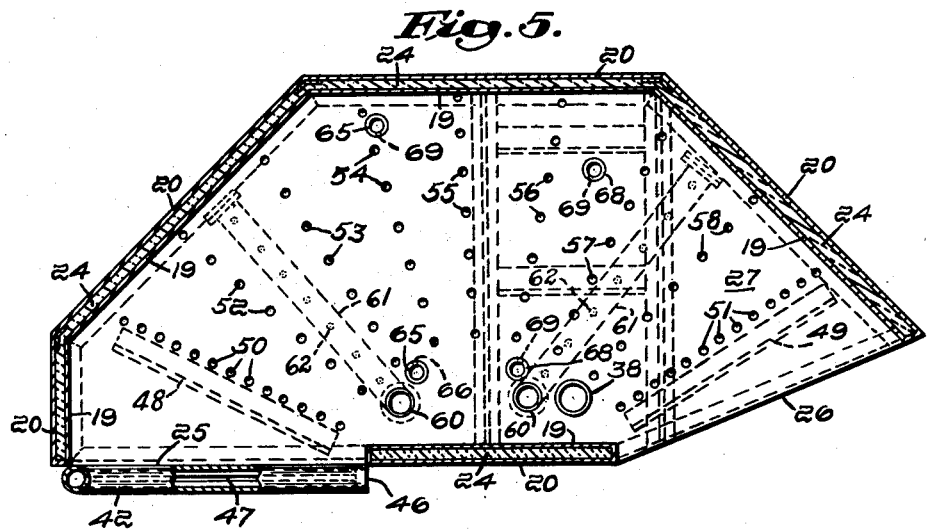

United States Patent Office 3,175,565
Patented Mar. 30, 1965

3,175,565
DISHWASHER-DRYER COMBINATION
Fred C. Dawson, 7 Suttcliff Ave., Canton, Mass.;
Henriette M. Dawson, executrix of said Fred C. Dawson, deceased
Filed May 4, 1961, Ser. No. 107,683
5 Claims. (Cl. 134—70)

This invention relates to dish dryers, and relates more particularly to dryers for dishes emerging on conveyors from dishwashing machines.

Dishwashing machines used in hotels, hospitals and large restaurants move the washed dishes in baskets on conveyors, the heat from the rinsing water being depended upon to dry the dishes. The highest temperature rinsing water used is about 180 degrees F. For the older types of dishes, this has been generally satisfactory, but is not satisfactory with the newer type plastic dishes which do not retain the heat imparted to them by the heated rinsing water long enough for the heat to evaporate the water droplets clinging to the dishes.

This invention provides an open bottom dryer which can be placed on the table of a dish washing machine straddling the conveyor where it emerges from the washing machine. The dryer has a plenum chamber in its upper portion which has a floor over the conveyor which has a large number of small, spaced-apart holes. A blower blows air through an electric heater into the plenum chamber, and the heated air is discharged at high velocity through the perforated floor of the plenum chamber onto the dishes to be dried. The heated air, after it passes over the dishes, is continuously recirculated with resulting economy of operation.

In one embodiment of the invention, unheated air is blown across the inlet of the dryer for blowing many of the water droplets from the dishes before they are exposed to the drying air, thus effecting additional economy of operation. Just inside the inlet of the dryer an air curtain is blown across the interior of the dryer for preventing the escape of heated air. Another such air curtain is provided across the outlet of the dryer, these air curtains effecting additional economy of operation.

The cups and glasses and other such dishes in the baskets on such conveyors are usually inverted for facilitating drainage so that the heated air blown downwardly from the plenum chamber cannot directly contact the water droplets adhering to the interior surfaces of such dishes. In one embodiment of this invention where the associated washer is so constructed that there is access to the underside of its conveyor, one or more pipes extend from the plenum chamber under the conveyor, and have spaced-apart, small perforations through which heated air is blown at high velocity upwardly against the dishes for more quickly drying their interiors. In another embodiment of this invention, where the associated washer is so constructed that there is no or limited access to the underside of its conveyor, pipes extend from plenum chamber down along the sides of the conveyor and have spaced-apart, small perforations through which heated air is blown at high velocity against the sides of the dishes, this heated air eddying around and entering the interiors of the inverted dishes.

An object of this invention is to dry dishes issuing from a dish washing machine.

This invention will now be described with reference to the annexed drawings, of which:

FIG. 1 is a top plan view of a drying machine embodying this invention, supported on the outlet table of a dish washing machine;

FIG. 2 is a side view of FIG. 1;

FIG. 3 is a sectional view along the lines 3—3 of FIG. 1;

FIG. 4 is a section along the lines 4—4 of FIG. 3, and

FIG. 5 is a section along the lines 5—5 of FIG. 3.

A conventional dish washing machine 10, the dish outlet end of which is shown by FIGS. 1 and 2 has a conventional, imperforate conveyor 11 shown by the dashed-dot lines on FIG. 1, and has an outlet table 12 on which is supported a dish dryer 14 embodying this invention.

As shown by FIG. 3, the table 12 has a curved opening 16 above the outlet end of the conveyor 11, and through which would project dishfilled, imperforate baskets on the conveyor, which are not shown. The dryer 14 has an open bottom 17 above the opening 16, and is supported on the table 12 around the opening 16, by structural angles 18 to which inner vertical, metal side walls 19, and outer, vertical metal side walls 20 are attached. The dryer has an inner, horizontal metal top wall 21 connecting the tops of the walls 19, and has an outer, horizontal, metal top wall 22 connecting the tops of the walls 20. The spaces between the walls 19 and 20 and 21 and 22 are filled with heat insulation 24. The dryer has a dish inlet 25 and a dish outlet 26. The conveyor 11 would move in a clockwise direction.

A horizontally extending, perforated metal wall 27 is spaced below the inner top wall 21 to form between the walls 27 and 21 and the inner side walls 19, a plenum chamber 28. Supported on the outer top wall 22 is a pressure blower 29 having its outlet 30 connected by a duct 31 to the top of the interior of an air heater 32 which contains electric heating units 33. The blower 29 is driven by an electric motor 34. The heater 32 has combined electric and heat insulation 35 around the units 33. The open bottom of the heater 32 connects through aligned openings in the top walls 22 and 21 and the insulation 24 therebetween, with the interior of the plenum chamber 28. The inlet of the blower 29 is connected by a duct 38 which extends through aligned openings in the top walls 22 and 21 and the insulation 24 therebetween and the wall 27, into the interior of the dryer 14. The duct 38 has a volume control damper therein, adjustable by a handle 40. The open lower end of the duct terminates just above the bottom of the dryer 14.

The interior of the heater 32 above the heating units 33, is connected by a pipe 41 to a pipe 42 which extends horizontally above the inlet 25. The pipe 42 has a closed outer end 46, and has a narrow slot 47 along the center of its lower side. The purpose of the pipe 42 is to blow a jet of recirculated air before it is reheated by the heating units 33, downwardly upon the dishes entering the dryer inlet 25, for blowing droplets of water from the dishes.

As shown by FIG. 5, the metal wall 27 forming the bottom of the plenum chamber 28, has just back of the inlet 25, a row of closely-spaced, aligned small holes 50 which extend transversely above the interior of the dryer, and has just ahead of the outlet 26, a similar row of holes 51. Heated air projected through the holes 50 forms an air curtain across the interior of the dryer just back of its inlet 25, and heated air projected through the holes 51 forms an air curtain across the interior of the dryer just ahead of its outlet 26. An inwardly inclined deflector sheet 48 extends downwardly from the wall 27 just ahead of the row of holes 50, and a similar inwardly inclined deflector sheet 49 extends downwardly from the wall 27 just behind the row of holes 51. The deflector sheets 48 and 49 deflect the air curtains inwardly, thus reducing the leakage past them. The wall 27 has spaced apart equal distances between the rows of holes 50 and 51, rows of aligned holes 52, 53, 54, 55, 56 and 57 which have the same diameters as the holes 50 and 51 but are spaced farther apart since their purpose is to project jets of heated air downwardly upon the dishes travelling through the dryer. As shown by FIG. 5, the rows of holes 50, 51, 52, 53, 54, 55, 56, and 57 are on converging axes as is required by the shape of the dryer over the return bend of the conveyor 11.

The plenum chamber 28 is connected by a pair of vertically extending pipes 60 to a pair of spaced-apart, horizontally-extending pipes 61 which extend transversely across the space below the opening 16 in the table 12. The pipes 61 have closed outer ends and have spaced-apart, small holes 62 along the centers of their upper sides, and serve to project jets of heated air upwardly against the bottoms of dishes on the imperforate conveyor 11.

The plenum chamber 28 is also connected to the upper ends of a pair of vertically extending pipes 65 which extend into the dryer near its center, on opposite sides of the path of the dishes therethrough, and which have small, spaced-apart holes 66 along the centers of their sides which face the dishes, so that heated air is projected across the path of the dishes from opposite sides thereof. The lower ends of the pipes 65 are closed.

The plenum chamber 28 is also connected to the upper ends of a pair of vertically extending pipes 68 which extend into the dryer about halfway between the pipe 65 and the outlet 26, on opposite sides of the path of travel of the dishes through the dryer. The pipes 68 have small spaced-apart openings 69 along the centers of their sides which face the dishes so that heated air is projected across the path of the dishes from opposite sides thereof. The lower ends of the pipes 68 are closed.

The pipes 61 which extend horizontally under the dryer casing would not be used with some dishwashers which do not have space for them. With such dishwashers the vertically extending pipes 65 and 68 would be used. With dishwashers using the pipes 61, the pipes 65 and 68 would not be required.

*Operation*

In operation, the conveyor 11 rotates in a clockwise direction, conveying washed dishes from the dishwasher 10, into the inlet 25 of the dryer, through the dryer and out its outlet 26. The blower 29 draws air through the recirculated air duct 38, and blows recirculated air through the pipe 42 onto the dishes as they enter the inlet 25 to blow drops of water from the dishes. The blower also blows recirculated air through the heater 32 and into the plenum chamber 28. Heated air from the plenum chamber passes at high velocity through the openings 50 in the lower wall 27 of the plenum chamber just behind the inlet 25 establishing an air curtain across the interior of the dryer just back of the inlet 25, and through the openings 51 in the wall 27 just ahead of the outlet 26, establishing an air current across the interior of the dryer just ahead of the outlet 26. The deflector sheets 48 and 49 deflect the air currents slightly inwardly thus aiding their action in preventing the entry of cold air through the inlet 25 and the outlet 25 into the dryer.

Heated air from the plenum chamber 28 also passes at high velocity through the openings 52, 53, 54, 55, 56, 57, and 58 in the wall 27 onto the dishes passing through the dryer.

Heated air from the plenum chamber 28 also passes at high velocity through the small holes 62 in the horizontal pipes 61 upwardly against the bottoms of the dishes passing through the dryer.

Heated air from the plenum chamber 28 also passes at high velocity through the small holes 66 in the vertical pipes 65, and the small holes 69 in the vertical pipes 68 against the sides of the dishes as they travel through the dryer.

Dryers embodying this invention not only remove all moisture from the washed dishes, but destroy all bacteria, and improve the appearance of the dried dishes since the usual surface films are removed.

What is claimed is:

1. In combination with a dishwasher having a conveyor for moving dishes through and from the dishwasher and having an outlet table where the conveyor emerges from the dishwasher, a dish dryer having vertical side walls on opposite sides of said conveyor and defining an open ended passage through which the washed dishes are moved on said conveyor, said passage having an open bottom, said passage having a dish inlet and a dish outlet at its ends, means for supporting the lower ends of said walls on said table with said open bottom above said conveyor, means including the upper portions of said side walls, end walls above said inlet and outlet and a wall forming the top wall of said passage forming a plenum chamber above said passage, said top wall having a plurality of spaced-apart small openings therein in rows along the length of said passage, a blower, a duct connecting the inlet of said blower with the interior of said passage above its said bottom, an electric heater having its outlet connected to the interior of said chamber, and a duct connecting the outlet of said blower with the inlet of said heater.

2. The invention claimed in claim 1 in which said top wall has a first row of small openings extending across the top of said passage just behind said inlet, and has a second row of small openings extending across said top of said passage just ahead of said outlet, for forming with heated air from said chamber, air curtains across said inlet and outlet.

3. The invention claimed in claim 2 in which there is provided external said passage above the space just ahead of said inlet, a horizontally extending pipe connected to said last mentioned duct and means in its lower surface for projecting air in advance of said heater onto dishes before they enter said inlet for blowing water droplets from the dishes.

4. The invention claimed in claim 1 in which there are provided in said passage, a plurality of vertically extending pipes connected to said chamber and spaced apart on one side of said passage, and a plurality of vertically extending pipes connected to said chamber and spaced apart on the other side of said passage, said pipes having in their inner surfaces means for projecting heated air from opposite sides of said passage onto the sides of dishes moving through said passage.

5. The invention claimed in claim 4 in which said top wall has a first row of small openings extending across the top of said passage just behind said inlet, and has a second row of small openings extending across said top of said passage just ahead of said outlet, for forming with heated air from said chamber, air curtains across said inlet and outlet.

References Cited by the Examiner

UNITED STATES PATENTS

| | | | |
|---|---|---|---|
| 1,399,415 | 12/21 | Taliaferro | 34—150 |
| 1,603,760 | 10/26 | Furkert | 34—150 |
| 1,910,868 | 5/33 | Webb | 34—225 X |
| 2,036,503 | 4/36 | Russell | 34—224 |
| 2,287,217 | 6/42 | Wright | 34—231 X |
| 2,385,962 | 10/45 | Barnett | 34—224 |
| 2,595,242 | 6/52 | Goodin | 34—224 |
| 2,671,969 | 3/54 | Mayer | 34—224 |

NORMAN YUDKOFF, *Primary Examiner.*

GEORGE D. MITCHELL, CHARLES O'CONNELL, *Examiners.*